US012789381B2

(12) United States Patent
Rai et al.

(10) Patent No.: US 12,789,381 B2
(45) Date of Patent: Nov. 10, 2026

(54) CONTROL DEVICE AND CONTROL METHOD HAVING INTERLOCK FUNCTION

(71) Applicant: FANUC CORPORATION, Yamanashi (JP)

(72) Inventors: Youichi Rai, Yamanashi (JP); Reo Kimachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 85 days.

(21) Appl. No.: 18/682,436

(22) PCT Filed: Sep. 7, 2021

(86) PCT No.: PCT/JP2021/032899

§ 371 (c)(1),
(2) Date: Feb. 9, 2024

(87) PCT Pub. No.: WO2023/037418

PCT Pub. Date: Mar. 16, 2023

(65) Prior Publication Data

US 2025/0128417 A1 Apr. 24, 2025

(51) Int. Cl.
*B25J 9/16* (2006.01)
*B25J 19/06* (2006.01)

(52) U.S. Cl.
CPC ............. *B25J 9/1676* (2013.01); *B25J 19/06* (2013.01)

(58) Field of Classification Search
CPC .................... B25J 9/1676; B25J 19/06; G05B 2219/39091; G05B 2219/39099; G05B 2219/39135
See application file for complete search history.

(56) References Cited

U.S. PATENT DOCUMENTS 4,501,998 A 2/1985 Nozawa et al.
5,191,188 A 3/1993 Miyajima
6,285,921 B1 * 9/2001 Ito ........................ G05B 19/408 700/250
2007/0150093 A1 6/2007 Nagatsuka et al.
(Continued)

FOREIGN PATENT DOCUMENTS

DE 69736733 T2 * 2/2007 ........... G05B 19/408
EP 0845725 * 9/2006
EP 3722053 A1 10/2020
(Continued)

OTHER PUBLICATIONS

Translation for reference JPH0325509A (Year: 1991).*

*Primary Examiner* — Rachid Bendidi
(74) *Attorney, Agent, or Firm* — HAUPTMAN HAM, LLP

(57) ABSTRACT

The present invention provides a control device and a control method that can eliminate problems related to interlock settings associated with backward execution of a robot program. A first control device comprises: a program execution unit that executes a robot program that operates a first robot, and while the program is executing backwards, ignores at least one logic statement that is included in the program and that relates to an interlock signal; and an interlock setting unit that, during backward execution of the program that operates the robot, enables interlocking for a pre-registered interlock signal.

3 Claims, 3 Drawing Sheets

(56) References Cited

U.S. PATENT DOCUMENTS

| | | | |
|---|---|---|---|
| 2020/0180155 | A1 | 6/2020 | Hall |
| 2020/0298403 | A1 | 9/2020 | Nilsson et al. |

FOREIGN PATENT DOCUMENTS

| | | | | |
|---|---|---|---|---|
| JP | S57-069312 | A | | 4/1982 |
| JP | H02-250104 | A | | 10/1990 |
| JP | H03-025509 | A | | 2/1991 |
| JP | H0325509 | A | * | 2/1991 |
| JP | H04-007709 | A | | 1/1992 |
| JP | H08-071979 | A | | 3/1996 |
| JP | H10-011124 | A | | 1/1998 |
| JP | H10-260714 | A | | 9/1998 |
| JP | 2000-137514 | A | | 5/2000 |
| JP | 2012-166290 | A | | 9/2012 |
| TW | 201736065 | A | | 10/2017 |
| TW | 202132070 | A | | 9/2021 |
| WO | 2019111413 | A1 | | 6/2019 |

* cited by examiner

CONTROL DEVICE AND CONTROL METHOD HAVING INTERLOCK FUNCTION

RELATED APPLICATIONS

The present application is a National Phase of International Application No. PCT/JP2021/032899 filed Sep. 7, 2021.

TECHNICAL FIELD

The present invention relates to a controller and a control method having an interlock function for avoiding interference relating to a robot.

BACKGROUND ART

In a system where multiple robots operate in a shared working area, it is a well-known technic to set an interlock using a robot program, etc., to control the motions of the robots movements so as to prevent the robots from interfering or colliding with each other (e.g., see Patent Literature 1 and 2). Further, a technique is known that performs forward execution processing of a robot motion program and backward execution processing based on execution history data regarding the forward execution (see Patent Literature 3).

CITATION LIST

Patent Literature

[PTL 1] JP 1998 (H10)-260714 A
[PTL 2] JP 1996 (H08)-071979 A
[PTL 3] JP 1998 (H10)-011124 A

SUMMARY OF INVENTION

Technical Problem

Execution of a robot program may include not only forward execution in which the program is executed from the lowest line number to the highest line number, but also backward execution in which the program is executed from the highest line number to the lowest line number. Further, during the backward execution, settings may be made to ignore a logic statement in the program. However, when the ignored logic statement includes a process associated with an interlock signal, the interlock signal may not be switched appropriately and a problem such as robots colliding with each other may occur. In order to avoid such a problem, it is conceivable that an operator, etc., can manually switch the interlock signal or modify the program, but both of these tasks are time-consuming.

Solution to Problem

One aspect of the present disclosure provides a controller for avoiding interference between a plurality of industrial machines including at least one industrial robot, based on an interlock signal transmitted between the plurality of industrial machines, the controller comprising: a program execution unit configured to execute a robot program for operating the robot, and, during backward execution of the robot program, ignore at least one logic statement which is included in the robot program and associated with the interlock signal; and an interlock setting unit configured to automatically enable interlocking associated with a pre-registered interlock signal, during backward execution of the robot program for operating the robot.

Another aspect of the present disclosure provides a control method for avoiding interference between a plurality of industrial machines including at least one industrial robot, based on an interlock signal transmitted between the plurality of industrial machines, the method comprising the steps of: executing a robot program for operating the robot, and, during backward execution of the robot program, ignoring at least one logic statement which is included in the robot program and associated with the interlock signal; and automatically enabling interlocking associated with a pre-registered interlock signal, during backward execution of the robot program for operating the robot.

Advantageous Effects of Invention

According to the present disclosure, the interlocking associated with the pre-registered interlock signal is automatically enabled during the backward execution of the robot program, so interference with the robot can be reliably avoided without requiring the operator to perform troublesome work such as modifying the program.

DESCRIPTION OF EMBODIMENTS

Figure 1:
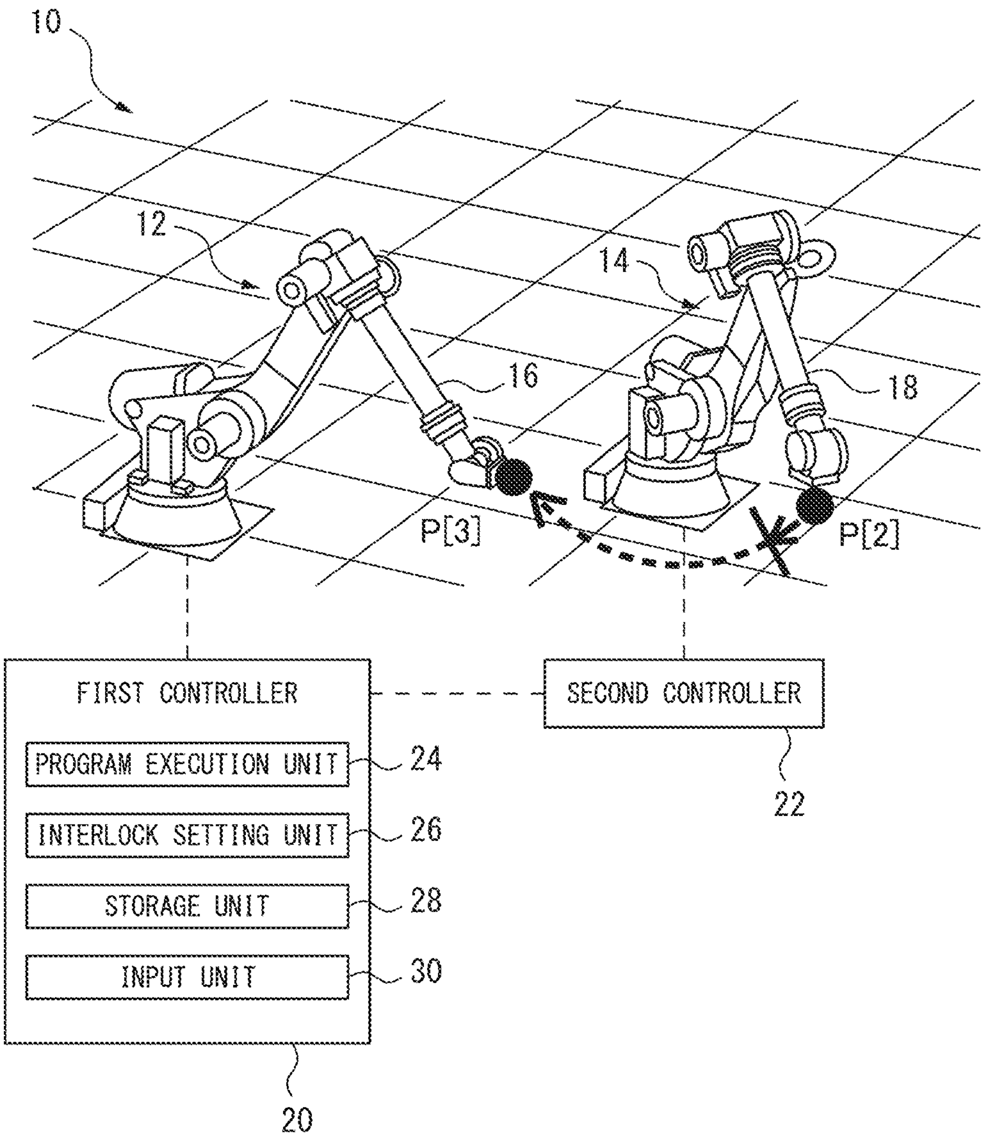
FIG. 1 is a view showing an example of a configuration of a system including a plurality of robots and a controller according to an embodiment.

FIG. 1 shows an example of a configuration of a system 10 which includes a plurality of industrial machines including at least one robot, which are controlled by a controller according to a preferred embodiment. Herein, the system 10 has a first robot 12 and a second robot 14 as industrial robots, and the first robot 12 and the second robot 14 have movable parts 16 and 18 such as robot arms, respectively. The motion of the first robot 12 is controlled by a first controller 20 connected to the first robot 12, and the motion of the second robot 14 is similarly controlled by a second controller 22 connected to the second robot 14.

Since working areas (or movable ranges of the robot arms) of the first robot 12 and the second robot 14 are overlapped with or close to each other, the first robot 12 and the second robot 14 are configured so that interference between the two robots is avoided based on a signal (in this case, an interlock signal) transmitted between (the controllers of) the two robots. Specifically, at least one of the first controller 20 and the second controller 22 (in the illustrated example, the first controller 20) has a program execution unit 24 configured to execute a robot program (hereinafter, referred to as merely "program") including at least one signal output command and at least one motion command for operating the robot, and, during backward execution of the program, ignore at least one logic statement which is included in the program and associated with the interlock signal; and an interlock setting unit 26 configured to automatically enable interlocking associated with a pre-registered interlock signal, during backward execution of the program for operating the robot.

Optionally, at least one of the first controller 20 and the second controller 22 (in the illustrated example, the first controller 20) has a storage unit 28 configured to store programs and/or calculation results of the program execution unit 24 and the interlock setting unit 26; and an input unit 30 by which an operator can register and input various settings and the like. As an example, the program execution unit 24 and the interlock setting unit 26 are a processor, the storage unit 28 is a memory such as a ROM or RAM, and the input unit 30 is a numeric keypad or a touch panel, etc. Note that the first controller 20 and the second controller 22 can also be made into a substantially integrated controller.

Next, with reference to FIGS. 2 and 3, interlocking which is set for the first robot 12 and the second robot 14 will be explained. Reference numeral 32 indicates a part of a first program for controlling the motion of the first robot 12, and reference numeral 34 indicates a part of a second program for controlling the motion of the second robot 14. Herein, the first robot 12 is configured so that a representative point of its hand (or a tip of the arm 16) is movable between positions P[1], P[2] and P[3] indicated by triangle marks in FIG. 3. It is assumed that, by forward execution of the first program 32, the representative point is positioned at position P[1], then linearly moves to position P[2], then linearly moves to position P[3], then linearly moves to position P[2] again, and then returns to position P[1].

Figure 3:
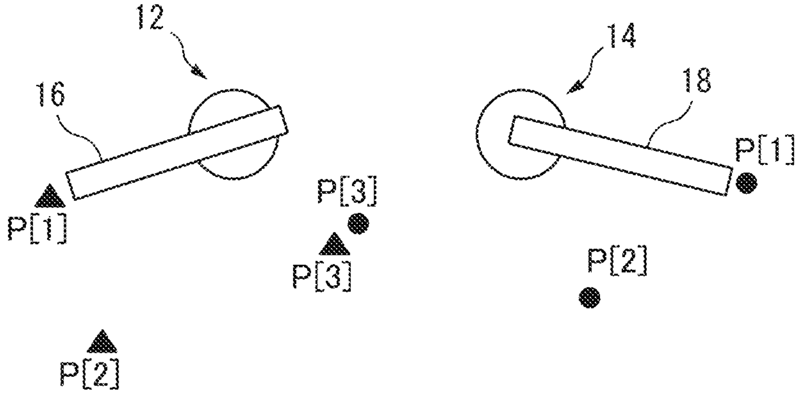
FIG. 3 is a schematic view illustrating a stopping or passing position of each robot.

On the other hand, the second robot 14 is configured so that a representative point of its hand (or a tip of the arm 18) is movable between positions P[1], P[2] and P[3] indicated by circular marks in FIG. 3. It is assumed that, by forward execution of the second program 34, the representative point is positioned at position P[1], then linearly moves to position P[2], and then linearly moves to position P[3]. Note that a symbol “J” in the programs 32 and 34 means an operation for rotating each axis of the robot to a target value, and a symbol “L” means an operation for linearly moving the hand, etc., of the robot at a predetermined speed.

Figure 2:
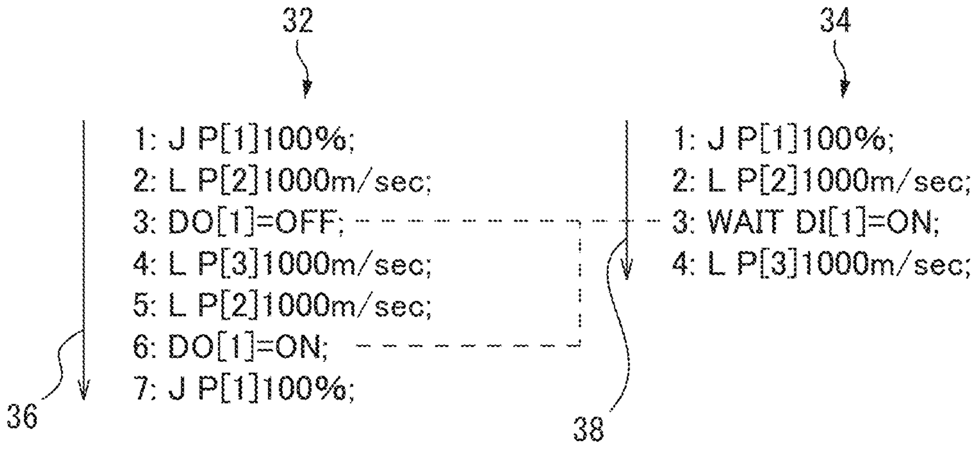
FIG. 2 is a view showing an example of a robot program.

In the present disclosure, “forward execution” of a program refers to executing each program from the smaller line number to the larger line number, as shown by arrows 36 and 38 in FIG. 2. To the contrary, “backward execution” of a program refers to executing the program from the higher line number to the smaller line number, as indicated by an arrow 40. Therefore, the forward/backward execution of the program has no relation to forward/backward movement of the robot arm. For example, when the motion for moving the robot arm backward (i.e., the tip of the arm approaches the center of the robot) is taught, the robot arm is moved backward (i.e., the tip of the arm tip is moved closer to the center of the robot) by the forward execution of the program. On the other hand, by the backward execution of the program, the robot arm is moved forward (i.e., the tip of the arm is moved away from the center of the robot).

The first program 32 and the second program 34 include settings relating to interlocking between the first robot 12 and the second robot 14. Here, as shown in FIG. 3, the position P[3] (triangle mark) of the first robot 12 and the position P[3] (circular mark) of the second robot 14 are substantially the same or relatively close, so both robots will contact or interfere with each other when the robots are located at position P[3] at the same time. Therefore, it is necessary to set an interlock to prevent both robots from positioning or approaching position P[3] at the same time.

Concretely, in the first program 32, after the first robot 12 moves to position P[2] (line number 2), the interlock signal DO[1] is set to “OFF” (line number 3). On the other hand, in the second program 34, after the second robot 14 moves to position P[2] (line number 2), the robot 14 waits until the interlock signal becomes “ON” (line number 3), and thus the second robot 14 cannot move to position P[3] at this time point.

Next, the forward execution of the first program 32 progresses, and when the first robot 12 moves to position P[3] and returns to position P[2] again (line number 5), the interlock signal DO[1] is switched to “ON” (line number 6). Then, the second robot 14 moves toward position P[3] (line number 4). In this way, interference between the robots can be prevented by, for example, the interlocking using DO/DI signals transmitted between the robots.

In this embodiment, it is assumed that the first program 32 is executed forward to line number 7 and then backward executed from line number 7. However, during the backward execution, at least one logic statement such as a signal switching process is ignored and is not executed, and conversely, a motion statement for moving the robot is executed. The reason for such a setting is that it is difficult to determine whether the logic statement should also be executed during the backward execution, and in addition, there are many cases where the logic statement should not be processed. For example, when the logic statement is a process for counting the number of cycles, it is often inappropriate to change the number of cycles (or a register value) even during the backward execution. Therefore, in many cases, a setting is made to ignore all logic statements during the backward execution.

Figure 4:
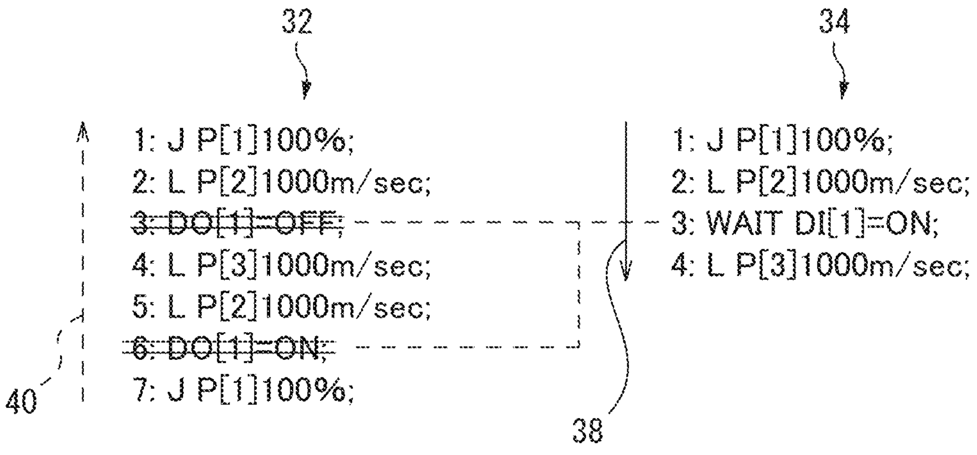
FIG. 4 is a view showing an example in which the robot program of FIG. 2 is executed backwards.

FIG. 4 shows an example of a process when the backward execution of the first program 32 is performed. As described above, the logic statement is ignored during the backward execution, and thus the signal setting/switching process (line numbers 3 and 6) is not executed. Then, when the first robot 12 moves to position P[3] due to the backward execution of the first program 32, DO[1] remains set to “ON” due to the forward execution of the first program 32, and thus the second robot 14 is in a state where it can access position P[3]. Therefore, during the backward execution of the first program 32, both the first robot 12 and the second robot 14 move or approach the position P[3], and the two robots may interfere with each other.

Figure 5:
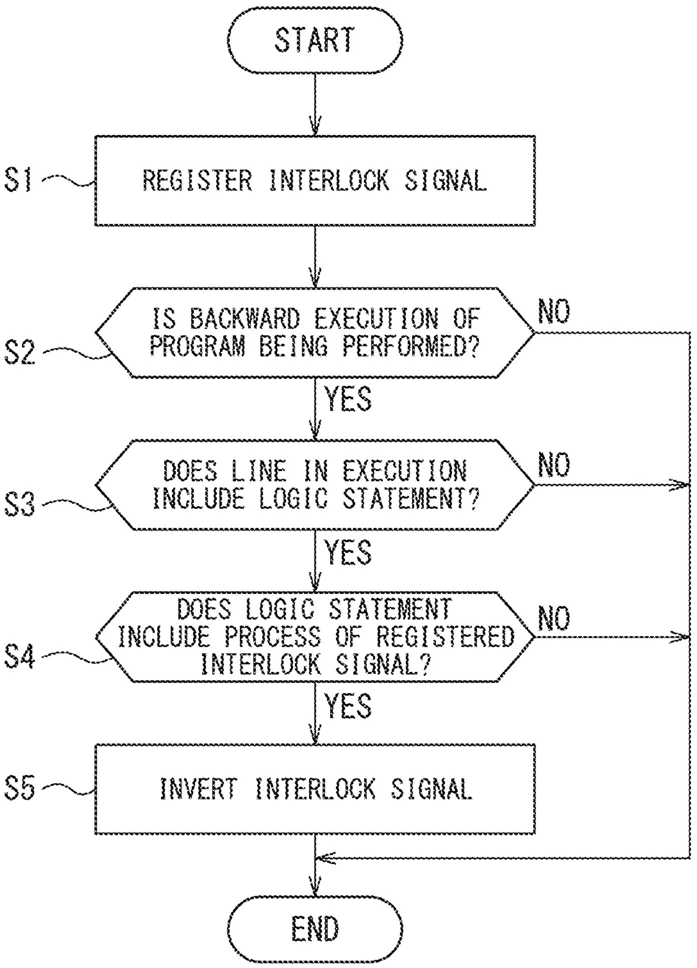
FIG. 5 is a flowchart showing an example of a process in the controller of FIG. 1.

In view of the above, in this embodiment, the process illustrated in the flowchart of FIG. 5 is used to prevent problems caused by ignoring the logic statement during the backward execution of the program. First, in step S1, the user or operator of the robot uses the input unit 30, etc., to set or register an interlock signal in the first control device 20, second control device 22, etc. This interlock signal is included in the logic statement of at least one of the programs 32 and 34, and should be inverted (or switched) at the time of the backward execution of the program. For example, when it is expected that the interlock which should be inherently enabled will remain disabled due to the logic statement being ignored during backward execution of the program, an interlock signal associated with this interlock is registered. The registered interlock signal is stored in the storage unit 28, etc.

There are several ways to register the interlock signal. For example, the operator who is creating or editing the program by teaching, etc., may manually register the interlock signal in the program which should be inverted when the backward execution is performed, by using the input unit 30, etc. Alternatively, when the program is prepared in advance in the form of a template, etc., all interlock signals in the program may be automatically registered when the controller reads the program. In that case, the operator may also delete from the registered interlock signals those interlock signals which should not be inverted during the backward execution.

Next, the program execution unit 24 executes the first program 32 and judges as to whether or not the back ward execution of the first program 32 is being performed (step S2). When the backward execution of the first program 32 is being performed, the program execution unit 24 judges as to whether or not the line in execution includes a logic statement associates with the interlock signal (step S3). As described above, when the line in execution during the backward execution includes the logic statement, this logic statement is ignored.

Next, the interlock setting unit 26 judges as to whether the ignored logic statement includes a process of the interlock signal registered in step S1 (specifically, stored in the storage unit 28, etc.) (step S4). When the ignored logic statement includes a process of the registered interlock signal, the interlock signal associated with the registered interlock signal is inverted (here, from ON to OFF) while the backward execution of the first program 32 is performed (step S5). In other words, the interlock setting unit 26 automatically enables an interlock which is associated with the previously registered interlock signal and is being invalid, when performing the backward execution of the program. Through such a process, even in the backward execution of the program, the interlock between the first robot 12 and the second robot 14 is appropriately set, and interference between the two robots is avoided. Note that the processes in steps S2 to S5 can be automatically performed by the program execution unit 24 or the interlock setting unit 26, etc.

Here, the process of enabling the interlock, specifically switching (inverting) the interlock signal, is not performed by an instruction of the operator or a command statement written in the program. Instead, the previously registered interlock signal is switched (e.g., inverted from ON to OFF, or from OFF to ON) by an internal process which is automatically executed as a specification of (the processor, etc.) of the controller. Therefore, the operator only needs to set and register in advance the signal to be inverted during the backward execution, and there is no need to perform troublesome tasks such as teaching or modifying the program. Further, it is preferable that the specifications of the controller prevent the operator from modifying the specific contents of such internal process. However, it is possible to provide a switch, etc., in the controller so that the operator can select whether or not the internal process should be performed.

In this regard, when the interlock signal is unconditionally inverted during the backward execution, there is a risk that undesirable results may occur, such as invalidating an interlock which should not actually be invalidated. Therefore, in the embodiment, by having the operator register in advance the interlock signal which should be inverted during the backward execution, it is possible to switch only the registered interlock signal during the backward execution, thereby an appropriate interlock can be set.

Although the above embodiment describes the interlock between the two robots, the present disclosure is also applicable to two industrial machines, such as a robot and a machine tool. Further, the number of the industrial machines is not limited to two, but may be three or more.

In the above embodiment, the program execution unit 24 has a function of performing forward execution and backward execution of a program including at least one motion command and at least one signal output command. In addition, the interlock setting unit 26 has a function as a signal processing unit for performing a process for the pre-registered signals during the backward execution, the process being the opposite of the signal output command during the forward execution (e.g., when the signal output command is from ON to OFF during the forward execution, the signal output command is from ON to OFF during the backward execution). In the prior art, a signal processing during backward execution is performed based on historical data of a target signal, and thus the process is not always the opposite of forward execution. On the other hand, in the embodiment, regardless of the execution history related to the signal processing, it is possible to perform the process (such as inverting process) during the backward execution, which is opposite to the signal output command during the forward execution. Therefore, in the embodiment, there is no need to save historical data or perform arithmetic processing.

REFERENCE SIGNS LIST

- 10 robot system
- 12 first robot
- 14 second robot
- 16, 18 movable part
- 20 first controller
- 22 second controller
- 24 program execution unit
- 26 interlock setting unit
- 28 storage unit
- 30 input unit
- 32 first robot program
- 34 second robot program

The invention claimed is:

1. A controller for avoiding interference between a plurality of industrial machines including at least one industrial robot, based on an interlock signal transmitted between the plurality of industrial machines, the controller comprising:

a program execution unit configured to execute a robot program for operating the at least one industrial robot, and, during backward execution of the robot program, ignore at least one logic statement, regarding setting and switching of the interlock signal, which is included in the robot program and associated with the interlock signal; and an interlock setting unit configured to automatically enable interlocking associated with a pre-registered interlock signal associated with a process included in the at least one logic statement which is ignored during the backward execution of the robot program, during the backward execution of the robot program for operating the at least one industrial robot, wherein the interlock setting unit is configured to enable the interlocking by an internal process which is automatically executed as a specification of the controller, regardless of execution of the at least one logic statement.

2. A control method for avoiding interference between a plurality of industrial machines including at least one industrial robot, based on an interlock signal transmitted between the plurality of industrial machines, the method comprising:

executing a robot program for operating the at least one industrial robot, and, during backward execution of the robot program, ignoring at least one logic statement, regarding setting and switching of the interlock signal, which is included in the robot program and associated with the interlock signal;

automatically enabling an interlock associated with a pre-registered interlock signal associated with a process included in the at least one logic statement which is ignored during the backward execution of the robot program, during the backward execution of the robot program for operating the at least one industrial robot; and enabling the interlock by an internal process which is automatically executed as a specification of a controller for avoiding interference between the plurality of industrial machines, regardless of execution of the at least one logic statement.

3. A controller for processing an interlock signal transmitted between a plurality of industrial machines including at least one industrial robot, the controller comprising:

a program execution unit configured to perform forward execution and backward execution of a program including at least one motion command and at least one signal output command; and an interlock setting unit configured to, during the backward execution of the program and regardless of execution history of signal processing which has been executed during the forward execution, perform a process of inverting a pre-registered interlock signal to be opposite to an interlock signal output by the at least one signal output command during the forward execution, for avoiding interference between the plurality of industrial machines.

* * * * *